June 2, 1942.  F. SUND  2,284,777
PICK-UP MECHANISM
Filed Oct. 13, 1939  2 Sheets-Sheet 1
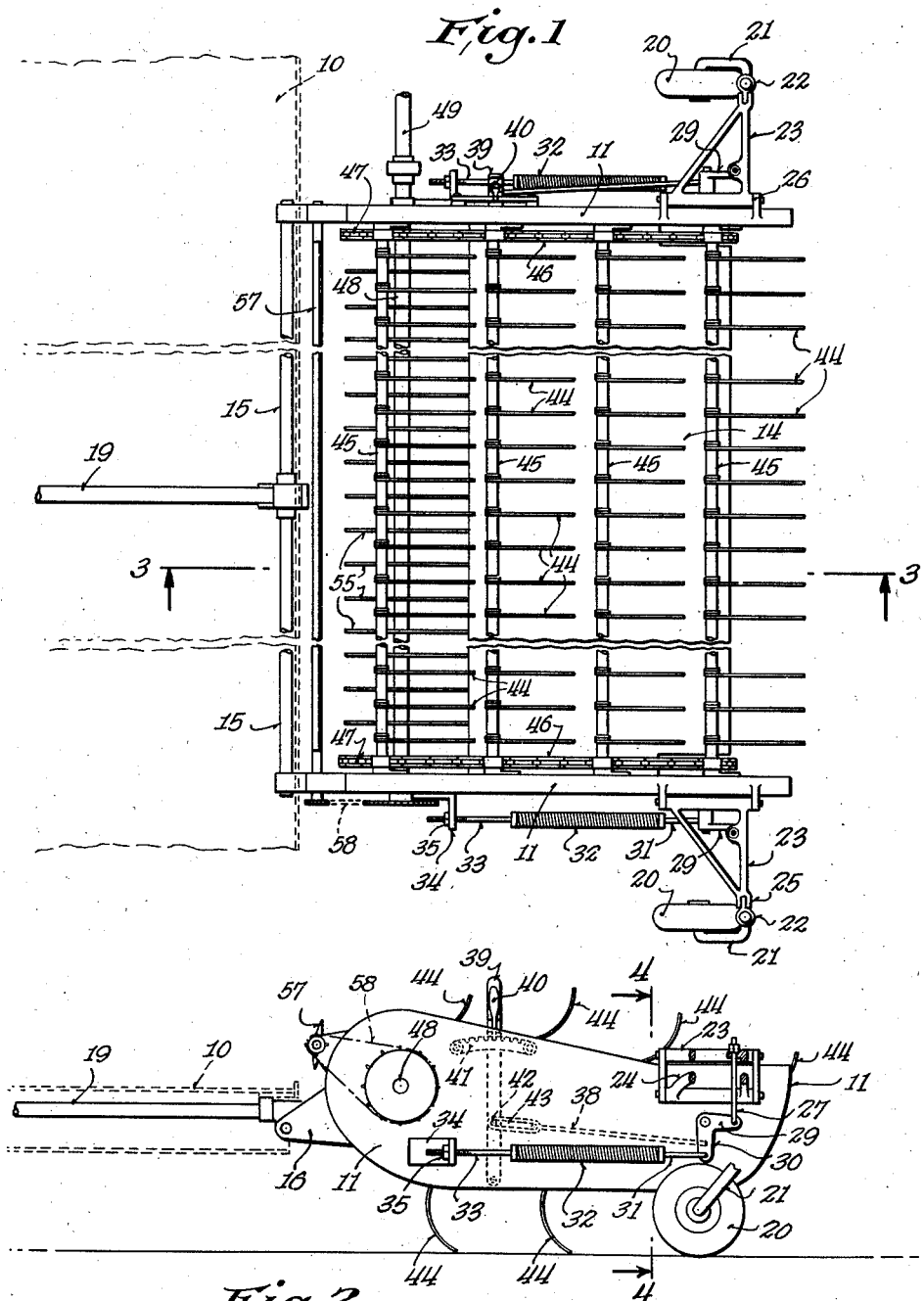
INVENTOR.
FRED SUND
BY
ATTORNEY.

June 2, 1942.  F. SUND  2,284,777
PICK-UP MECHANISM
Filed Oct. 13, 1939  2 Sheets-Sheet 2
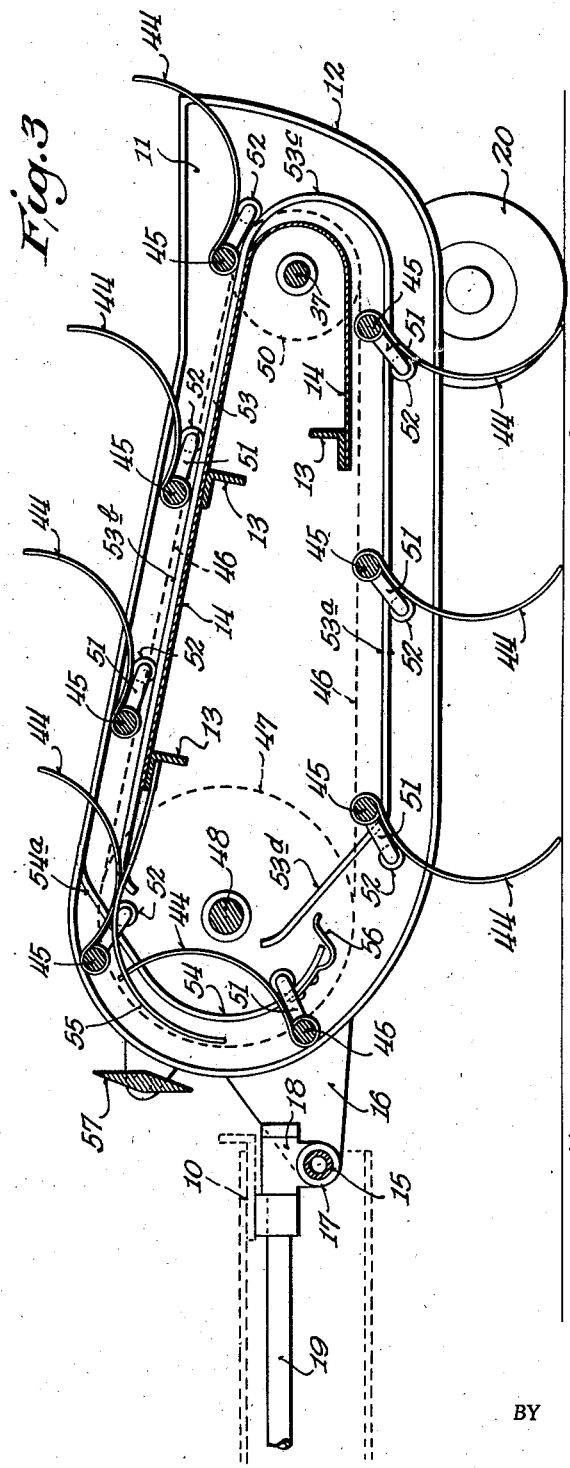
INVENTOR.
FRED SUND
BY
ATTORNEY.

Patented June 2, 1942

2,284,777

UNITED STATES PATENT OFFICE 2,284,777

PICKUP MECHANISM

Fred Sund, Newburg, N. Dak.

Application October 13, 1939, Serial No. 299,241

13 Claims. (Cl. 56—364)

This invention relates to pick-up mechanisms for use in the harvesting of grain, hay and other straw-like materials.

Pick-up mechanisms for this purpose ordinarily include successive rows of pick-up fingers carried by and between endless conveyors in such manner as to bring the fingers, one row at a time, into contact with or adjacent the ground surface. In devices of this type heretofore designed the fingers fail to perform an effective raking action, with the result that much of the grain or hay is left on the ground and lost.

One object of the present invention is to provide a pick-up mechanism capable of more effectively and cleanly removing the grain or hay from the ground. This is accomplished in part by causing each row of fingers to assume a raking position before the preceding row has been elevated from the ground, so that there is at least one row of fingers in raking position at all times.

Another object is to provide an improved mounting for a pick-up mechanism by which the latter may more readily adapt itself to irregularities in the ground surface and thus insure a more intimate and effective relation between the pick-up fingers and the ground.

Another object is to provide a resilient or floating support for a pick-up mechanism by which the fingers thereof, when in raking position, may be maintained in light contact with the ground surface so as to insure a more effective raking action.

Another object is to improve the finger travel so to more effectively lift and convey the grain or hay to the point of discharge.

Other more specific objects and advantages will appear, expressed or implied, from the following description of a pick-up mechanism constructed in accordance with the present invention.

In the accompanying drawings:

Figure 1 is a plan view of a pick-up mechanism embodying the present invention and showing the same attached to the forward portion of a conventional grain harvester.

Fig. 2 is a side elevation with parts broken away for the sake of clarity.

Fig. 3 is a sectional view on a larger scale taken substantially along the line 3—3 of Fig. 1.

Fig. 4 is a fragmentary sectional view taken along the line 4—4 of Fig. 2.

Fig. 5 is an enlarged plan view of the swivel connection shown in Fig. 1.

The pick-up mechanism selected for illustration is designed to be attached to the forward platform 10 of a conventional grain harvester combine in such position as to precede the harvester through the field. It comprises a frame or chassis having upright side plates 11 stiffened by inturned peripheral flanges 12 and rigidly connected and braced by appropriate cross bars 13 fixed thereto. The chassis is further stiffened and braced by a sheet metal shield 14 fixed to the bars 13.

The chassis is supported at its rear by a transverse tube or bar 15, fixed at its opposite ends in appropriate brackets 16 at the rear ends of the side plates 11, and supported at its mid point in a sleeve 17 in which it is journalled. The chassis is thus free to swing about the horizontal axis of the transverse bar 15. The sleeve 17 is formed integral with a second sleeve 18 rotatably mounted upon the forward end of a horizontal supporting bar 19 fixed to the under side of the harvester platform 10. The chassis is thus free to tilt about the axis of the bar 19 which is disposed at right angles to the axis of the transverse bar 15.

The front of the chassis is supported preferably by two caster wheels 20 disposed at opposite sides thereof and which, together with the sleeve support 17—18, just described, provide a flexible three point mounting by which the chassis is enabled to freely negotiate irregularities in the ground surface. The chassis is preferably resiliently suspended between the caster wheels 20 through mounting structures which will now be described.

Each caster wheel is journalled upon the lower bent end of a bar 21 having an upper shaft extension journalled in a vertical tubular bearing member 22. Each member 22 is sustained in vertical position by two upper and lower parallel link structures 23 and 24 preferably of triangular form. Each link is hingedly connected at its apex 25 to the bearing member 22 and at its base 26 to the adjacent side plate 11. A tension rod 27 coacts with the upper link 23 and with the chassis to support the latter.

In this instance the rod 27 is fixed at its upper end in lug 28 on the link 23 and is connected at its lower end with one arm 29 of a bell crank, the other arm 30 being connected through a rod 31 to a tension spring 32 which in turn is connected through a rod 33 to a bracket 34 on the side plate 11 of the chassis. The tension in the spring 32 may be adjusted by manipulation of a nut 35 on the rod 33. Each bell crank 29 is preferably fixed to an end of a rock shaft 37 journalled in the forward ends of the side plates 11, so that the bell cranks are constrained to rock in unison and thus insure a uniform action between the mounting means of both caster wheels 20.

Although downward movement of the chassis relative to the wheels 20 is thus resisted by the tension in the springs 32, such movement is also preferably limited by appropriate means, such as a link 38 connected at its forward end to the arm 30 of the bell crank and at its other end to a lever 39 rockably mounted upon one of the side plates 11 of the chassis. The lever is adjustably fixed by a conventional pawl 40 and quadrant 41. In this instance the connection between the link 38 and lever 39 is through a pin 42 on the lever engaged in a slot 43 in the link, the slot 43 coacting with the pin 42 to limit rocking action of the bell crank in one direction but permitting the bell crank to rock in the other direction independently of the lever.

The pick-up mechanism shown also includes several rows of prongs or fingers 44, each row being carried by a transverse bar 45 rockably supported adjacent its ends by a pair of parallel conveyor chains 46 in a well-known manner. In this instance, each chain is trained over a driving sprocket 47, fixed to a drive shaft 47 driven from the harvester through appropriate shafting 49, and also trained over an idle sprocket 50, journalled upon the rock shaft 37.

Each finger supporting bar 45 is provided at one or both ends with a radially extended crank arm 51 having a roller 52 for coaction with cam tracks 53 and 54 by which the bars 45 and fingers 44 are controlled during their course of travel with the chains 46. The cam tracks 53 and 54 are carried by and project inwardly from a side plate 11.

The track 53 has an extended horizontal portion 53a disposed substantially parallel to and below the lower stretch of the chains 46, so that as the fingers 44 travel toward the right (Fig. 3) they are suspended substantially vertically with their free ends closely following the ground contour and are thus in position to perform an effective raking action.

The track 53 also has an upper straight section 53b parallel to and adjacent the upper stretch of the chain 46, and a curved section 53c eccentrically disposed with respect to the idle sprocket 50 and so shaped as to cause each row of fingers 44 to swing upwardly and thereby elevate the accumulated rakings and transport the same rearwardly over the shield or apron 14 contained in the chassis.

It will be noted that at the time that each row of fingers 44 swings upwardly from a raking position, two succeeding rows of fingers have assumed raking positions, so that the raking action is continuous rather than intermittent as in prior devices of this kind. As indicated particularly in Fig. 3, the fingers 44 are preferably bowed so as to further improve the raking action, and so that the fingers of each row provide a cradle-like formation particularly well adapted for picking up the rakings and transporting the same rearwardly of the chassis.

Provision is made for stripping from each row of carrier fingers 44 the materials carried thereby, and for that purpose a row of spaced stripper fingers 55 are provided which in this instance are shown extending rearwardly from beneath the rear end of the shield 14 into the path of travel of the carrier fingers. In the machine shown, the carrier fingers 44 pass downwardly through the row of stripper fingers 55 with a peculiar swinging movement, such as to insure clean withdrawal of the carrier fingers from the materials stripped therefrom. For this purpose the cam track 54 has an inclined portion 54a which slopes downwardly from a point above the rear end of the portion 53b of the track 53 and which merges into a curved portion disposed concentrically of the sprockets 47.

The arrangement is such that, during travel of each finger-carrying bar 45 rearwardly over and downwardly about the sprockets 47, the cam roller 52 thereof passes beyond the rear end of the track section 53b, thereby permitting the row of carrier fingers 44 to swing by gravity downwardly about the axis of their supporting bar and thus to pass downwardly through the row of stripper fingers 44. The inclined track section 54 is in position to coact with each cam roller 52 to insure such downward swinging movement. This downward clockwise swinging movement of each row of carrier fingers 44 about the axis of their carrier bar 45 occurs of course during advance of the carrier bar 45 in a counter-clockwise direction over and about the sprockets 47 with the result that the free trailing ends of the carrier fingers 44 ultimately pass downwardly through the row of stripper fingers 55 in such direction as to withdraw cleanly and freely from the materials thereby deposited on the stripper fingers.

It will thus be noted that during the stripping action, each row of carrier fingers 44 swing clockwise and therefore in a direction reverse to the counter-clockwise swing during the pick-up action and also reverse to the counter-clockwise travel of their supporting bar 45 about the sprockets 47.

After the stripping action, each cam roller 52 follows the curved track 54 until it encounters a resilient stop finger 56, disposed at the lower end of track 54 below the inclined rear extension 53d of the cam track 53, whereupon the roller 52 is momentarily arrested, causing its controlled bar 45 and fingers 44 to swing counter-clockwise into the raking position hereinabove described.

The material deposited by the fingers 44 upon the stripper fingers 55 is transferred by a rotating beater or feeder 57 onto the platform 10 of the harvester. In this instance the feeder 57 is continuously driven from the drive shaft 48 through appropriate means such as a conventional chain and sprocket drive 58, the rotation of the feeder being so timed as to avoid interference with the bars 45.

From the foregoing it will be noted that in the pickup mechanism shown, two or more rows of fingers 44 are always in raking position adjacent or upon the ground surface, the springs 32 normally coacting with the chassis and with the wheels 20 to resiliently sustain them in proper working relation with the ground surface. Under some conditions of operation, it is desirable that the raking fingers actually contact the ground surface, in which event they may assist the springs in sustaining the weight of the entire unit to an extent dependent upon the tension in the springs. Under such conditions the chassis may rise and fall in a manner to permit the raking fingers to closely follow the ground contour.

By adjustment of the hand lever 39, however, the chassis may be elevated so as to elevate the raking fingers above the ground to any height desired. When set to normally barely clear the ground, the raking fingers may nevertheless yield upwardly to avoid undue pressures against high ground contours, the freedom of movement of the pin 42 within the slot 43 making it possible for the chassis to rise above the lower limit set by the lever 39.

Various changes may be made in the embodiment of the invention hereinabove specifically described without departing from or sacrificing the advantages of the invention as defined in the appended claims.

I claim:

1. In a pick-up mechanism, the combination of a chassis, endless conveyor means on said chassis having a lower forwardly moving stretch, an upper rearwardly moving stretch, and an arcuate forward stretch between said lower and upper stretches, a plurality of rows of pick-up fingers mounted for travel with said conveyor means, and guide means coacting with said conveyor means to cause each row of fingers during their travel through said arcuate stretch to swing through an arc less than the arc traversed by said conveyor means.

2. In a pick-up mechanism the combination of a chassis, endless conveyor means thereon, a plurality of rows of pick-up fingers each bowed substantially from end to end, said rows of fingers being mounted for travel with said conveyor means forwardly beneath, upwardly, and rearwardly over said chassis, and guide means coacting with said conveyor means to maintain said fingers in recumbent load-carrying position during their rearward travel over said chassis.

3. In a pick-up mechanism the combination of a chassis, endless conveyor means thereon having a lower forwardly moving stretch and an upper rearwardly moving stretch, a plurality of rows of fiingers mounted for travel with said conveyor means, and finger positioning means for effecting an upward swinging pick-up movement of each row of fingers adjacent the forward end of said lower stretch and for effecting a load-carrying position of each row of fingers underneath the load of material thereon during travel thereof along said upper stretch, the fingers of each row being bowed substantially from end to end to form a cradle-like rack during travel thereof along said upper stretch.

4. In a pick-up mechanism for straw-like materials, the combination of a chassis, endless conveyor means thereon, said conveyor having a lower forwardly moving stretch, an upper rearwardly moving stretch, and a forward arcuate stretch connecting said lower and upper stretches, a row of pick-up fingers mounted to travel with said conveyor means, a relatively short arm fixedly related to said fingers, a guide element on said arm, a track on said chassis forming a guide for said element to thereby govern the position of said fingers by coaction with said conveyor means, said track having a lower portion below and parallel to the lower stretch of said conveyor means, an upper portion below and parallel to the upper stretch of said conveyor means, and a forward arcuate portion connecting said lower and said upper portions, and extending forwardly of the foremost point of said conveyor means.

5. In a pick-up mechanism the combination of a chassis, endless conveyor means thereon having a lower forwardly moving stretch and an upward rearwardly moving stretch, a plurality of rows of pick-up fingers mounted for travel with said conveyor means, a row of stationary stripper fingers disposed adjacent the rear end of said rearwardly moving stretch, and means coacting with said conveyor means for effecting an upward swinging pick-up movement of each row of pick-up fingers adjacent the forward end of said lower stretch and a downward swinging movement thereof through said row of stripper fingers adjacent the rear end of said rearwardly moving stretch, the forward swinging pick-up movement and the downward swinging stripping movement of said fingers with respect to said conveyor being in reverse directions of rotation.

6. In a pick-up mechanism the combination of a chassis, endless conveyor means thereon, a plurality of rows of bowed pick-up fingers mounted for travel with said conveyor means to pick up and carry materials rearwardly over said chassis, a row of stationary stripper fingers adjacent the rear of said chassis, and means coacting with said conveyor means to effect withdrawal of said bowed pick-up fingers substantially along the curve of their length downwardly through and from said stripper fingers thereby to deposit thereon materials carried by said pick-up fingers.

7. In a pick-up mechanism the combination of a chassis, endless conveyor means thereon, a plurality of rows of pick-up fingers, a support for each row of fingers mounted for travel with said conveyor means continuously in one direction around said chassis, a row of stationary stripper fingers adjacent the rear of said chassis, and means for swinging said pick-up fingers with respect to said conveyor in an opposite direction to the direction of movement of said conveyor to effect passage thereof through said row of stripper fingers.

8. In a pick-up mechanism for straw-like materials, the combination of a chassis, endless conveyor means thereon, said conveyor having a lower forwardly moving stretch, an upper rearwardly moving stretch, and an arcuate stretch near the rear of said chassis connecting said upper and lower stretches, a row of stripper fingers adjacent and within the arc of said arcuate stretch and curved similarly thereto, a row of pick-up fingers mounted to travel with said conveyor means around said chassis and to pass through said row of stripper fingers, a relatively short arm fixedly related to said pick-up fingers, a guide element on said arm, a track on said chassis forming a guide for said element to thereby govern the position of said pick-up fingers by coaction with said conveyor means, said track having an upper portion below and parallel to the upper stretch of said conveyor and terminating adjacent the beginning of said arcuate stretch to permit said pick-up fingers to drop into the interior of the machine, and a second track outside of the path of travel of the rollers adjacent and parallel to said arcuate stretch to assure withdrawal of said pick-up fingers through said stripper fingers.

9. In a pick-up mechanism for straw-like materials, the combination of a chassis, conveyor means thereon, pick-up fingers associated with said conveyor means for picking materials from the ground and carrying the same upwardly and rearwardly, means for supporting the rear of said chassis upon a trailing vehicle, a pair of wheels supporting the front of said chassis, a resilient suspension for said wheels permitting vertical movement thereof with respect to said chassis to compensate for ground irregularities, and means connecting said wheels and constraining the same to equal vertical movement with respect to said chassis.

10. In a pick-up mechanism for straw-like materials, the combination of a chassis, means for mounting the rear of said chassis upon a trailing vehicle, said mounting means permitting tilting of said chassis with respect to said vehicle about a lateral axis and about a longitudinal axis, conveyor means on said chassis, a plurality of pick-up fingers associated with said conveyor means and positioned to travel forwardly with respect to said chassis underneath the same along and in light contact with the ground, a pair of wheels at the front of said chassis, a resilient suspension for said wheels permitting up and down movement thereof with respect to said chassis, said resilient suspension being tensioned to maintain said fingers in light ground contact by raising and lowering said wheels to compensate for ground irregularities, and means connecting said wheels and constraining them to equal up and down movement with respect to said chassis.

11. In a pick-up mechanism for straw-like materials, the combination of a chassis, conveyor means thereon, pick-up fingers associated with said conveyor means for picking materials from the ground and carrying the same upwardly and rearwardly, means for supporting the rear of said chassis upon a trailing vehicle, a pair of wheels supporting the front of said chassis, means mounting each of said wheels for movement up and down with respect to said chassis, a rock shaft, lever means connecting each of said wheel mountings to said rock shaft to thereby constrain said wheels to equal up and down movement with respect to said chassis, and a spring coacting with said lever means to form a resilient suspension for said wheels.

12. In a pick-up mechanism the combination of a chassis, endless conveyor means thereon, a plurality of transverse rows of raking and pick-up fingers on said conveyor movable therewith forwardly beneath, upwardly, and rearwardly over said chassis, means coacting with said conveyor means for constraining each row of fingers to follow a substantially horizontal raking course beneath said chassis prior to pick-up movements thereof upwardly and over the latter, and means for floatably supporting said chassis so as to cause said rows of fingers to rest upon and follow the contour of the ground surface during their raking advance, said supporting means including resilient connections of high resilient capacity permitting said chassis and fingers to freely rise and fall relative to said supporting means in accordance with variations in ground contour.

13. In a pick-up mechanism the combination of a chassis, endless conveyor means thereon, a plurality of transverse rows of raking and pick-up fingers on said conveyor means movable therewith forwardly beneath, upwardly, and rearwardly over said chassis, means coacting with said conveyor means for constraining each row of fingers to follow a substantially horizontal raking course beneath said chassis prior to pick-up movements thereof upwardly and over the latter, and means for floatably supporting said chassis so as to cause said rows of fingers to rest upon and follow the contour of the ground surface during their raking advance, said supporting means including a flexible support for the rear of said chassis, a pair of supporting wheels for the front of said chassis, and resilient load sustaining connections between said wheels and chassis for partially supporting the front of said chassis, said resilient connections being of high resilient capacity thereby to permit free relative vertical movements between said wheels and chassis without materially varying the tension in said resilient connections.

FRED SUND.